United States Patent
Rammah et al.

(10) Patent No.: US 9,759,988 B2
(45) Date of Patent: *Sep. 12, 2017

(54) CAMERA FEATURES OF AN ELECTRONIC DEVICE

(71) Applicant: Apple Inc., Cupertino, CA (US)

(72) Inventors: Marwan Rammah, Cupertino, CA (US); Eric N. Nyland, Santa Clara, CA (US); Matthew D. Hill, Santa Clara, CA (US); Sawyer I. Cohen, Sunnyvale, CA (US); Scott A. Myers, Saratoga, CA (US); David A. Pakula, San Francisco, CA (US); Michael Benjamin Wittenberg, Sunnyvale, CA (US); Ashutosh Y. Shukla, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,394

(22) Filed: Sep. 13, 2016

(65) Prior Publication Data

US 2017/0003575 A1    Jan. 5, 2017

Related U.S. Application Data

(63) Continuation of application No. 14/604,657, filed on Jan. 23, 2015, now Pat. No. 9,494,845, which is a
(Continued)

(51) Int. Cl.
*G03B 17/12* (2006.01)
*G03B 17/02* (2006.01)
(Continued)

(52) U.S. Cl.
CPC ............. *G03B 17/12* (2013.01); *G02B 7/003* (2013.01); *G03B 17/02* (2013.01); *G03B 43/00* (2013.01);
(Continued)

(58) Field of Classification Search
CPC ...................................................... G03B 17/12
See application file for complete search history.

(56) References Cited

U.S. PATENT DOCUMENTS

| 7,559,798 B2 | 7/2009 | Ma | |
| 2004/0157652 A1* | 8/2004 | Yamazaki | H04M 1/0264 455/575.3 |

(Continued)

OTHER PUBLICATIONS

PCT Application No. PCT/US20151012693—International Search Report and Written Opinion dated May 27, 2015.

*Primary Examiner* — Clayton E LaBalle
*Assistant Examiner* — Dennis Hancock
(74) *Attorney, Agent, or Firm* — Downey Brand LLP

(57) ABSTRACT

An electronic device having a securing member for a camera module is disclosed. The securing member may include several flexible spring elements extending around the camera module to maintain the position of the camera module during an assembly process of the electronic device. The securing member and the housing may be made from an electrically conductive material or materials. In this manner, the securing member may further provide the camera module with an electrical ground to prevent excessive electric charge within the camera module. In some embodiments, an alignment member is positioned on the housing and aligns the camera module and/or securing member with an aperture of the housing.

20 Claims, 11 Drawing Sheets

Related U.S. Application Data continuation of application No. PCT/US2015/012693, filed on Jan. 23, 2015.

(60) Provisional application No. 62/043,666, filed on Aug. 29, 2014.

(51) Int. Cl.
*G03B 43/00* (2006.01)
*H04M 1/02* (2006.01)
*H04N 5/225* (2006.01)
*G02B 7/00* (2006.01)

(52) U.S. Cl.
CPC ........ H04M 1/0264 (2013.01); H04N 5/2257 (2013.01)

(56) References Cited

U.S. PATENT DOCUMENTS

| | | | |
|---|---|---|---|
| 2010/0150545 A1* | 6/2010 | Imai | G02B 7/102 396/535 |
| 2012/0014687 A1* | 1/2012 | Sanford | G03B 17/02 396/535 |
| 2014/0078708 A1 | 3/2014 | Song et al. | |
| 2014/0176792 A1 | 6/2014 | Cao | |

* cited by examiner

CAMERA FEATURES OF AN ELECTRONIC DEVICE

CROSS-REFERENCE TO RELATED APPLICATION

This application is a continuation of U.S. patent application Ser. No. 14/604,657, filed Jan. 23, 2015, entitled "CAMERA FEATURES OF AN ELECTRONIC DEVICE", now U.S. Pat. No. 9,494,845, issued Nov. 15, 2016, which is a continuation of International Application No. PCT/US15/12693, with an international filing date of Jan. 23, 2015, entitled "CAMERA FEATURES OF AN ELECTRONIC DEVICE", published as WO 2016/032561 on Mar. 3, 2016, which claims the benefit of priority under 35 U.S.C §119(e) to U.S. Provisional Application No. 62/043,666, filed on Aug. 29, 2014, each of which are incorporated herein by reference in its entirety.

FIELD

The described embodiments relate generally to an electronic device. In particular, the present embodiments relate to assembly and alignment of a camera module in the electronic device.

BACKGROUND

Electronic devices, such as smartphones or tablet computing devices, include an integrated camera module for capturing images. In order to fit within the housing of an electronic device, some camera modules include a volume less than 1 cubic centimeter and may be relatively lightweight. Due to the small form factor, some assembly issues associated with the camera module may occur. For example, the camera module may become dislodged or misaligned during assembly. One solution is to include apertures or cavities in the camera module such that the apertures or cavities may receive mounting pins in a housing of electronic device.

However, similar mounting issues may exist when the mounting pins are utilized. For example, vibration or other movement may cause the camera module to become dislodged from the mounting pins. Also, in some cases, a cowling is used to secure the camera module to the housing. When the camera module is not correctly engaged with the mounting pins, the cowling may apply a force to the camera module, and in turn, the mounting pins, causing the mounting pins to break.

SUMMARY

In one aspect, an electronic device is described. The electronic device may include a housing. The housing may include an interior region, an exterior region opposite the interior region, and also an aperture extending between the interior region and the exterior region. The electronic device may further include a camera module positioned on the interior region. In some cases, the camera module may include a first cavity and a second cavity. The electronic device may further include a securing member that receives the camera module. In some cases, the securing member may include a first spring member and a second spring member. In some embodiments, the first cavity receives the first spring member. Also, in some embodiments, the second cavity receives the second spring member. The electronic device may further include a turret assembly positioned on the exterior region. In some embodiments, the turret assembly extends through the aperture to engage the securing member.

In another aspect, a securing member for securing an internal component of an electronic device is described. The securing member may include a base portion electrically connected to a housing of the electronic device. The base portion may include an aperture that allows a portion of the internal component to extend through the base portion. The securing member may further include several spring members formed from an electrically conductive material. The several spring members may extend from the base portion and cooperate to secure the internal component to the housing. In some embodiments, when the internal component engages the several securing members, the base portion and the several spring members define an electrical grounding path to electrically connect the internal component to the housing.

In another aspect, a method for securing an internal component to a housing of an electronic device is described. The method may include positioning a securing member in an interior region of the housing. The securing member may be formed from an electrically conductive material and also include several spring members and an aperture. The method may further include extending the internal component through the aperture of the securing member. The method may further include engaging the internal component with the several spring members to secure the internal component to the housing. The method may further include electrically connecting the securing member to the housing to define an electrical grounding path for the internal component.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
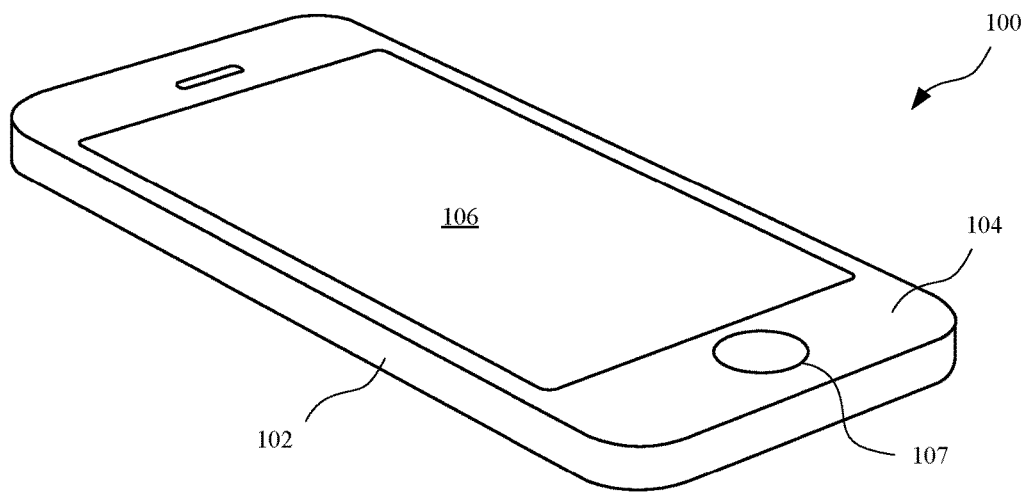
FIG. 1 illustrates an isometric view of an embodiment of an electronic device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an assembly for mounting a camera module within an electronic device. The electronic device may include a securing member attached to a housing of the electronic device. The securing member includes several spring members that secure the camera module within the securing member. The spring members may be bendable or flexible in order to provide a retaining force against the camera module within the securing member. Also, the camera module may include an enclosure or outer shield that encloses the internal components of the camera module. Both the securing member and the enclosure may be formed from a metallic material or materials. In this manner, when the securing member is in contact with the enclosure of the camera module, the securing member may provide an electrical pathway in order to dissipate excessive electrical charge (e.g., static charge) within the camera module thereby providing the camera module with an electrical ground, and accordingly and preventing damage to the camera module due to electrical charge buildup. Alternative embodiments for securing the camera module to the housing using a silicone-based retention strap are disclosed.

Also, techniques for improving the assembly process of components of an electronic device are described. In some embodiments, methods for improving the concentricity of the turret assembly with respect to the housing are disclosed. In some embodiments, the method includes rotating the turret assembly. In other embodiments, the method includes laser ablation or laser etching a mask positioned within the turret assembly. In some cases, the mask is formed having dimensions greater than the specified tolerance. Once the camera module is installed, these dimensions may be removed by laser ablation such that the mask includes desired dimensions. In other embodiments, additional alignment members (e.g., shims) may be added to align a barrel and/or enclosure of the camera module with respect to the aperture or opening of the housing. In some cases, an alignment member (e.g., alignment wall for the securing member) is formed having one or more dimensions that are smaller than the specified tolerance. Once the camera module is installed, these dimensions may be offset by using a shim or shims such that the camera module is positioned in a desired location.

Camera modules described in this detailed description may include magnets designed to focus a camera lens in the camera module. However, these magnets can be attracted to other metallic objects within an electronic device. Therefore, in some embodiments, a structure having magnetically attractable properties (e.g., magnet, ferrous material) is added to the electronic device to create a "magnetic balance" with respect to the magnetics within the camera module and offset any magnetic effects of the other metallic objects.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 illustrates an isometric view of an embodiment of electronic device 100, or simply device 100. In some embodiments, device 100 is a portable telecommunications device, such as an iPhone®, from Apple, Inc. from Cupertino, Calif. In other embodiments, device 100 is a tablet computing device, such as an iPad®, from Apple, Inc. from Cupertino, Calif. Device 100 may further include an enclosure 102 and a cover glass 104 positioned within enclosure 102. In some embodiments, device 100 includes display 106 positioned between enclosure 102 and cover glass 104. Display 106 may be configured to show visual content as well as receive a gesture, such as a touch input, from a user. Device 100 may further include button 107 as another means for inputting a gesture to device 100.

Figure 2:
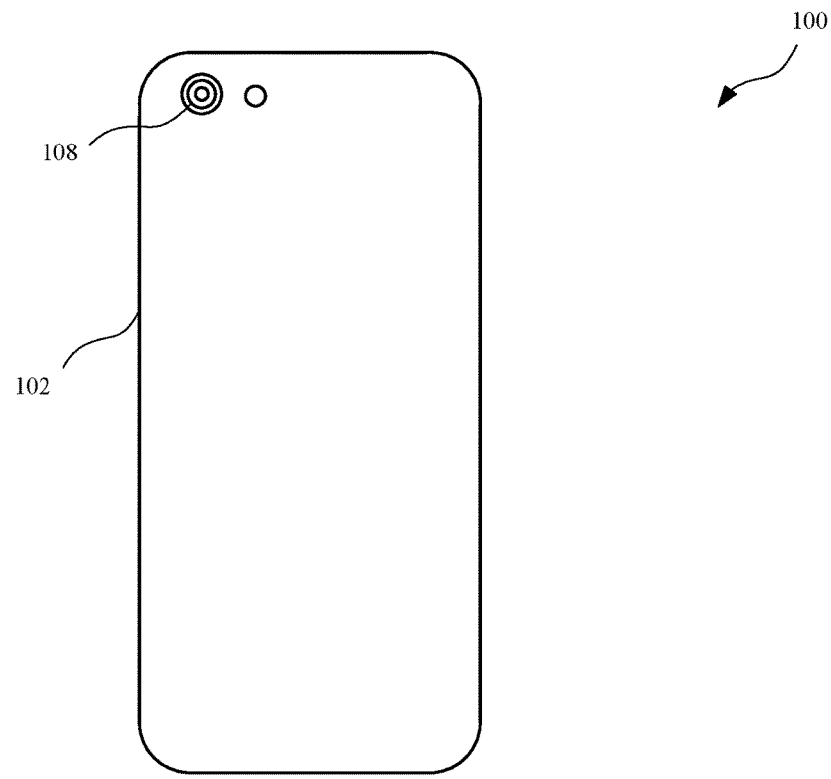
FIG. 2 illustrates a rear portion of the electronic device shown in FIG. 1, showing an embodiment of a camera module within the electronic device.

FIG. 2 illustrates a rear portion of device 100 shown in FIG. 1, rotated to show enclosure 102 having camera module 108. Camera module 108 may be configured to capture an image of an environment external to device 100. In some embodiments, camera module 108 is includes a VCM ("voice coil motor") used for features such as autofocus. Camera module 108 may be configured to capture an image by, for example, a user input by touching display 106 or in some cases, by pressing button 107, both of which are shown in FIG. 1.

Figure 3:
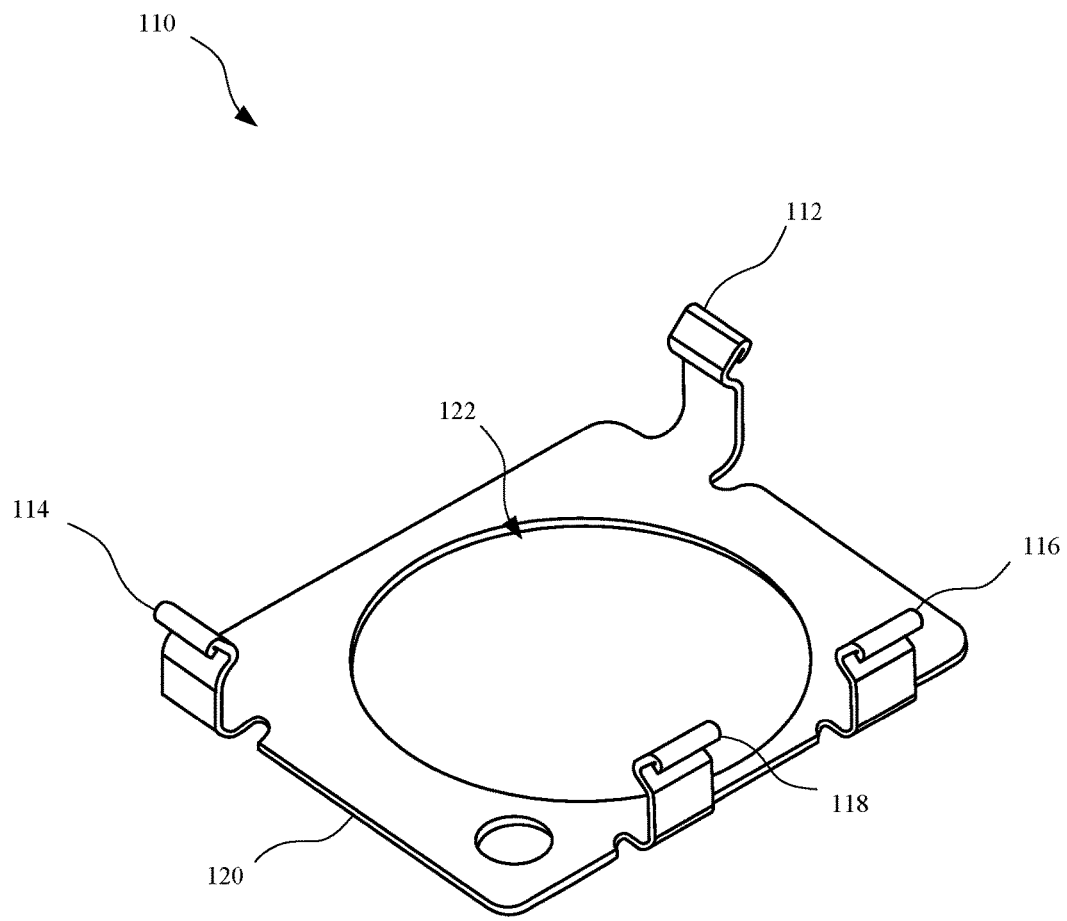
FIG. 3 illustrates an isometric view of an embodiment of a securing member configured to receive the camera module and provide an electrical ground for the camera module.

During assembly, camera module 108 may require securing means such that camera module 108 remains stationary. FIG. 3 illustrates an isometric view of an embodiment of securing member 110 designed to fit between enclosure 102 and cover glass 104 (shown in FIG. 2). Securing member 110 is designed to receive a camera module (e.g., camera module 108 in FIG. 1) and prevent the camera module from movement during assembly. In some embodiments, securing member 110 is a plate with several spring members integrally formed with the plate. For example, as shown, securing member 110 includes first spring member 112, second spring member 114 (opposite first spring member 112), third spring member 116, and fourth spring member 118, all of which are secured to base portion 120. Also, securing member 110 includes aperture 122 configured to receive a barrel of the camera module. The spring members include elastic properties allowing them to bend inward (for example, in a direction toward aperture 122) and outward (for example, in a direction away from aperture 122) in order to receive the camera module as well as provide a retaining force against the camera module to prevent the camera module from dislodging from securing member 110. In some embodiments, securing member 110 is formed from a metallic material or materials, such as aluminum, gold, or stainless steel (for example, SS 304 stainless steel). In the embodiment shown in FIG. 3, securing member 110 is formed from titanium copper. In this manner, securing member 110 may be magnetically inert, that is, unaffected by magnetic fields. Generally, securing member 110 may be formed from any metals known in the art that are electrically conductive and magnetically inert, and also include elastic properties that allow for bending means previously described. Also, in some embodiments, securing member 110 includes two or three spring members. In other embodiments, securing member 110 includes five or more spring members.

Figure 4:
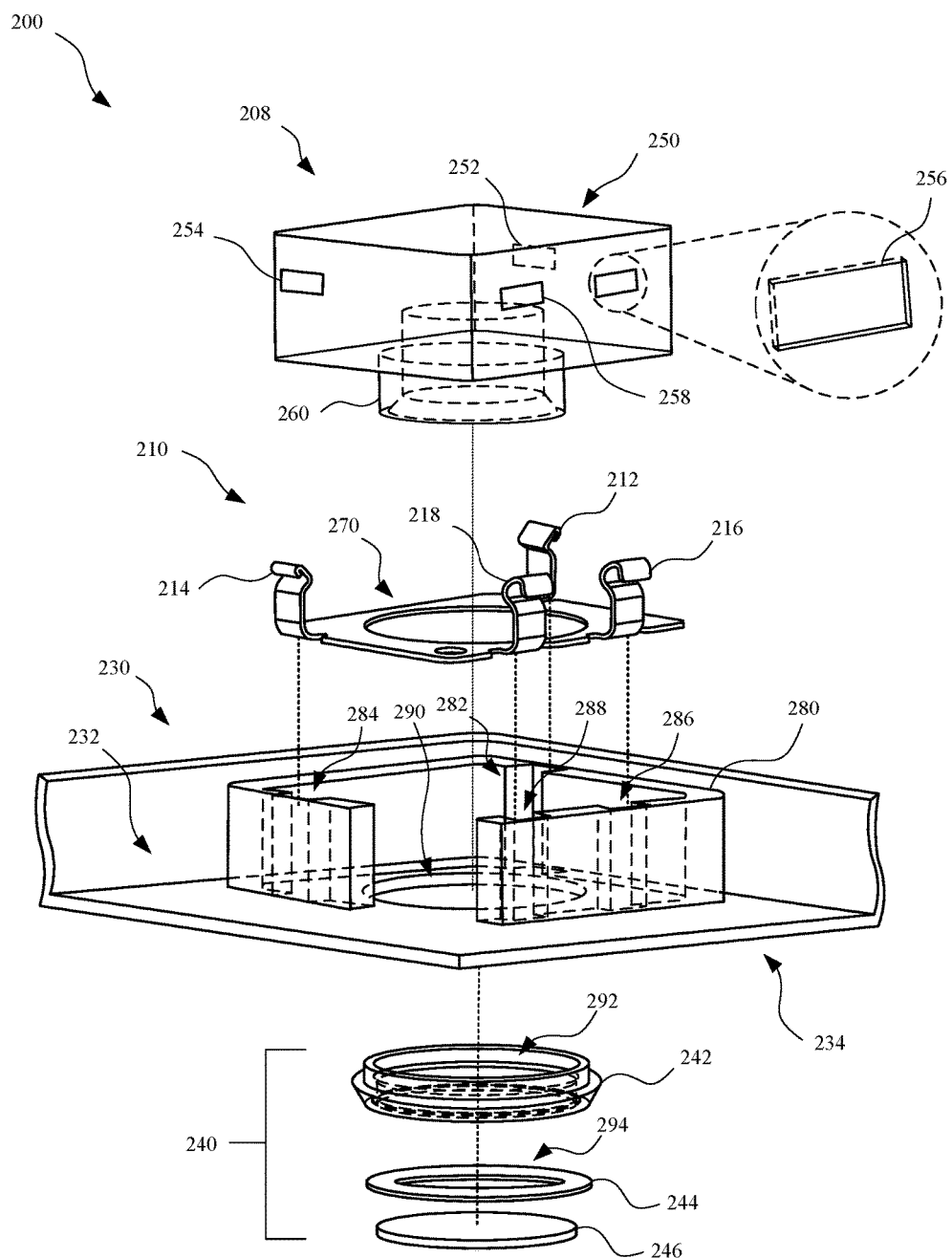
FIG. 4 illustrates an exploded view showing an embodiment of an electronic device having a camera module, a securing member, a housing, and a turret assembly, in accordance with the described embodiments.

FIG. 4 illustrates an exploded view showing an enlarged portion of an embodiment of electronic device 200 having camera module 208, securing member 210, housing 230, and turret assembly 240. Camera module 208 may include enclosure 250 formed from electrically conducive materials, such as metal. Enclosure 250 may include several cavities or pockets. For example, camera module 208 includes first cavity 252, second cavity 254, third cavity 256, and fourth cavity 258. The enlarged view shows third cavity 256 as an exemplary cavity showing a recessed portion. In some embodiments, the cavities are stamped into enclosure 250. In the embodiment shown in FIG. 4, the cavities are laser ablated, or laser etched, using a laser tool (not shown) configured to perform a material removal process to enclosure 250. Camera module 208 may also include barrel 260 protruding from enclosure 250. Also, although FIG. 4 shows camera module 208 secured by securing member 210, securing member 210 may be configured to secure other internal components of electronic device 200. Generally, any internal component capable of displacement during an assembly operation of electronic device 200 and/or any internal component requiring an electrical grounding path supplied in part by the securing member 210 may be secured by an alternate embodiment (not shown) of securing member 210.

FIG. 4 further shows securing member 210 that includes first spring member 212, second spring member 214 opposite first spring member 212, third spring member 216, and fourth spring member 218. Securing member 210 and the spring members may be made from the same materials as previously described for a securing member and spring members, respectively, and may be configured to perform the same functions. Securing member 210 also includes aperture 270 that receives barrel 260. Generally, aperture 270 includes a shape corresponding to that of barrel 260. Also, first cavity 252, second cavity 254, third cavity 256, and fourth cavity 258 are designed to receive first spring member 212, third spring member 216, and fourth spring member 218, respectively, when camera module 208 is inserted into securing member 210.

Housing 230 and its features may be configured to receive camera module 208 and securing member 210. In some embodiments, housing 230 is made from a metallic material or materials capable of conducting electrical current. Housing 230 may also include alignment member 280 located on interior region 232 of housing 230. Interior region 232 may be associated with an internal portion of several internal components of electronic device 200. In some embodiments, alignment member 280 is made from a pre-formed resin material. In the embodiment shown in FIG. 4, alignment member 280 is made from plastic. Alignment member 280 may include first opening 282, second opening 284 (opposite first opening 282), third opening 286 and fourth opening 288. These openings are designed and positioned within alignment member 280 such that the spring members of securing member 210 may be positioned within the openings of alignment member 280. For example, first opening 282 is designed to receive first spring member 212. Also, alignment member 280 can be designed such that when securing member 210 is positioned within alignment member 280, aperture 270 of securing member 210 is concentric, or aligned and centered, with aperture 290 of housing 230. In this manner, camera module 208 (in particular, barrel 260) may be readily received by aperture 290 of housing 230.

FIG. 4 further shows turret assembly 240 including turret 242, mask 244 and window 246. Turret 242 may include aperture 292 concentric with respect to aperture 290 when turret assembly 240 is assembled to housing 230. Also, turret 242 may be made from materials resistant to deforming under high heat, such as metal. In this regard, turret 242 may be welded to securing member 210. This will be discussed later. Mask 244 is generally an opaque ring-like structure having an aperture 294, and may prevent excessive light from reaching camera module 208. This may be ambient light or light from a camera flash of an electron device that is reflected toward camera module 208. Also, mask 244 may provide a cosmetic enhancement to electronic device 200. Mask 244 may be adhesively secured to turret 242 and/or window 246. Window 246 is generally transparent and may provide protection to a lens (not shown) of camera module 208. Window 246 may be adhesively secured to turret 242. Turret assembly 240 may be engaged with exterior region 234 of housing 230. Exterior region 234 may be associated with an outer surface of electronic device 200 generally visible when electronic device 200 is assembled. In other words, exterior region 234 is opposite interior region 232. In some embodiments, aperture 290 is designed to receive a portion of turret assembly 240. Also, in some embodiments, when the components shown in FIG. 4 are assembled, turret assembly 240 is secured to securing member 210 (e.g., by welding). Further, based on the apertures of turret 242 and mask 244 as well as the transparency of window 246, turret assembly 240 may define a viewing range for camera module 208 when camera module 208 captures an image. Also, in some embodiments, barrel 260 may extend through aperture 270 of securing member 210, aperture 290 of housing 230, and aperture 292 of turret 242.

Figure 5:
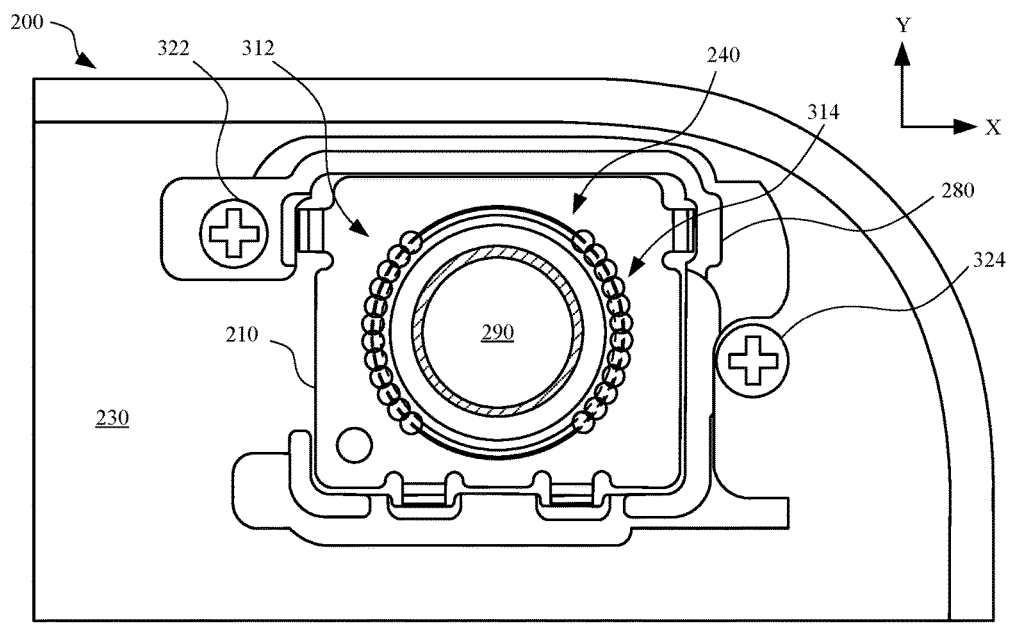
FIG. 5 illustrates a plan view of an enlarged portion of an electronic device showing some of the components shown in FIG. 4 assembled in the electronic device, in accordance with the described embodiments.

FIG. 5 illustrates a plan view of an enlarged portion of electronic device 200 showing some of the components shown in FIG. 4 assembled in electronic device 200. The camera module is removed for purposes of illustration. As shown, securing member 210 is positioned within alignment member 280. In some embodiments, securing member 210 and turret assembly 240 are adhesively secured to housing 230 by, for example, a conductive adhesive. In other embodiments, securing member 210 and turret assembly 240 are secured to housing 230 by solder. In the embodiment shown in FIG. 5, securing member 210 and turret assembly 240 are welded to housing 230. As shown, first weld 312 and second weld 314 form an electro-mechanical bond to secure securing member 210 and turret assembly 240 proximate to aperture 290 of housing 230. In this manner, securing member 210 and housing 230, both of which may be formed from electrically conductive materials, may provide an electrical ground for components in contact with securing member 210, such as a camera module. In other embodiments, the weld or welds extend around the entire circumference of aperture 290. Not only is securing member 210 able to prevent a camera module from lateral (X-Y) movement as well as movement in a z-direction perpendicular to the X-Y axis, but securing member 210 also provides a means for electrically grounding the camera module positioned in securing member 210. Accordingly, securing member 210 of electronic device 200 may be referred to as a multi-functional component which may reduce the number of necessary components in electronic device 200, which in turn may reduce the number of manufacturing steps.

Also, although not shown, a cowling may be positioned over the camera module after the camera module is secured to securing member 210. Electronic device 200 may include first fastener 322 and second fastener 324 configured to secure the cowling over the camera module.

Figure 6:
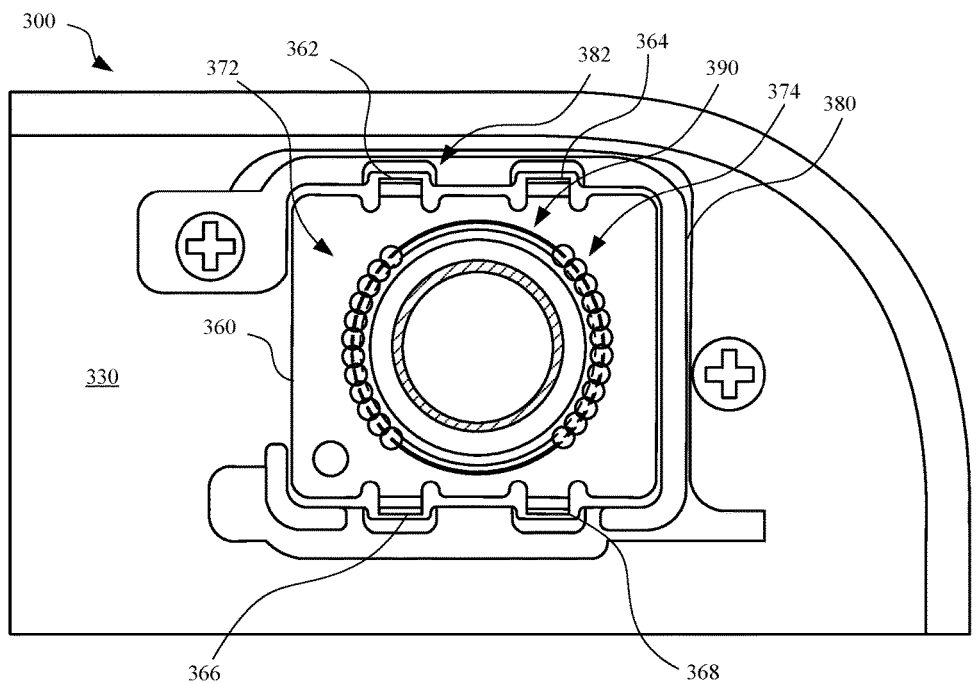
FIG. 6 illustrates a plan view of an alternate embodiment of an enlarged portion of an electronic device having a securing member welded to a turret assembly, in accordance with the described embodiments.

Securing members may include different configurations/orientations of spring members. Accordingly, a housing may include different configurations of alignment members. For example, FIG. 6 illustrates a plan view of an alternative embodiment of electronic device 300 that includes securing member 360 and alignment member 380. In this embodiment, securing member 360 includes first spring member 362 and second spring member 364, both of which are on a same side or edge of securing member 360. Securing member 360 may further include third spring member 366 opposite first spring member 362, and fourth spring member 368 opposite second spring member 364. Accordingly, alignment member 380 may include openings (e.g., first opening 382) in different locations corresponding to the aforementioned spring members. It will be appreciated that securing member 360 and the spring members may be made from the same materials as previously described for a securing member and spring members, respectively, and may be configured to perform similar functions. Also, FIG. 6 shows securing member 360 welded to turret assembly 390 via first weld 372 and second weld 374, and accordingly, securing member 360 and turret assembly 390 are secured to housing 330.

Figure 7:
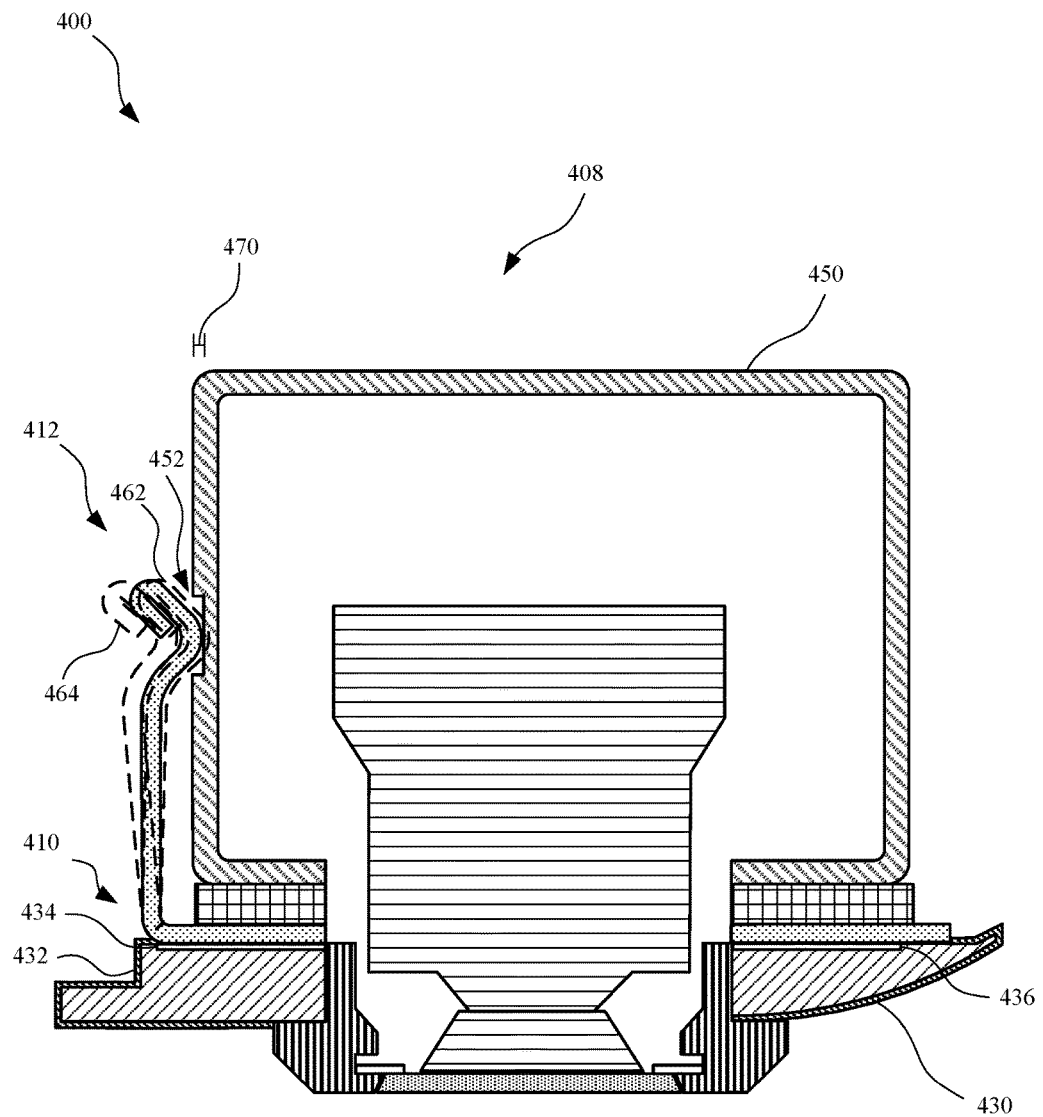
FIG. 7 illustrates a cross sectional view of an embodiment of a camera module, showing the camera module secured to a housing via a securing member, in accordance with the described embodiments.

FIG. 7 illustrates a cross sectional view of an embodiment of camera module 408, showing camera module 408 secured to a housing 430 of electronic device 400 via a securing member 410, in accordance with the described embodiments. Securing member 410 includes first spring member 412 positioned within first cavity 452 of enclosure 450 of camera module 408. First spring member 412 is shown in a secured position in order to provide a retaining force against camera module 408 to prevent camera module 408 from unwanted movement. To illustrate the flexibility of first spring member 412, FIG. 7 shows first spring member 412 may be in a first position 462 (dotted lines) when camera module 408 is not positioned within securing member 410. Also, first spring member 412 may be in a second position 464 (dotted lines) while camera module is inserted into securing member 410 but before first spring member 412 is positioned within first cavity 452. Also, first cavity 452 is formed in enclosure 450 by a laser etch process (not shown). First cavity 452 may include a depth 470 within enclosure approximately in the range of 30-70 micrometers. It will be appreciated that other spring members disclosed may perform in a similar manner as that of first spring member 412.

In some embodiments, housing 430 is anodized in order to provide certain aesthetic features. This may subject housing 430 to several chemicals (e.g., acids) which may define an anodized layer on housing 430 configured to enhance the appearance and strength of housing 430. However, the anodization layer is generally non-conductive in terms of electrical conductivity. However, a portion of housing 430 in direct contact with securing member 410 may be free of an anodization layer such that housing 430 combines with securing member 410 to provide an electrical ground for camera module 408. In the embodiment shown in FIG. 7, housing 430 includes anodization layer 432, but further includes first portion 434 and second portion 436 which define areas of housing 430 in which anodization layer 432 is removed. First portion 434 and second portion 436 allow securing member 410 to be in electro-mechanical contact with housing 430 such that housing 430 combines with securing member 410 to for an electrical ground for camera module 408. Removal means of anodization layer 432 may include laser ablating or laser etching, sanding, grinding, etc.

Figure 8:
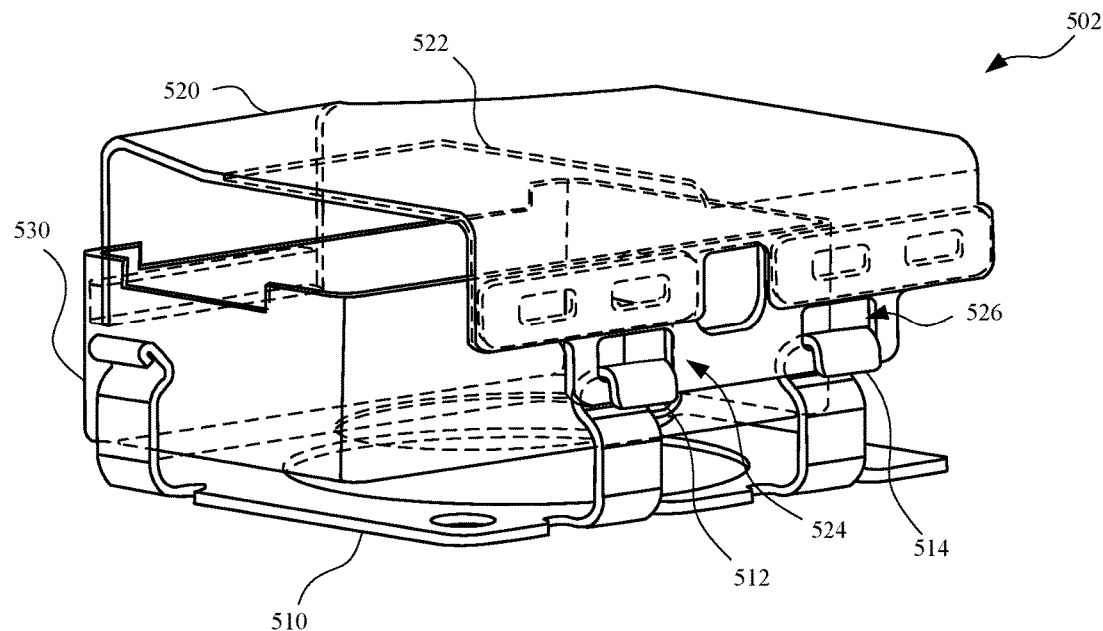
FIG. 8 illustrates an isometric view of an embodiment of an assembly including a securing member, a retention member, and a holding member configured to secure a camera module.
Figure 9:
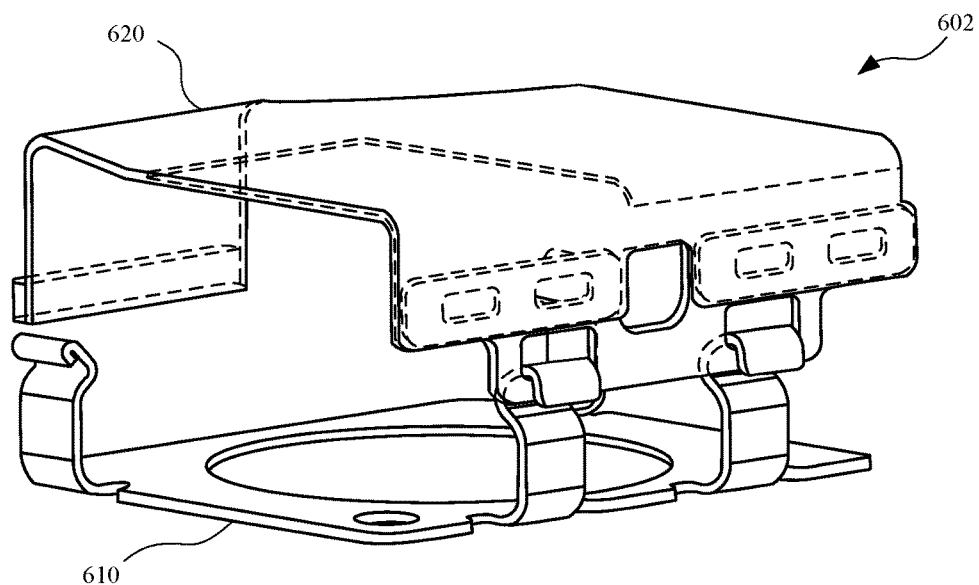
FIG. 9 illustrates an isometric view of an alternate embodiment of a securing member having a retention member configured to secure the camera module.
Figure 10:
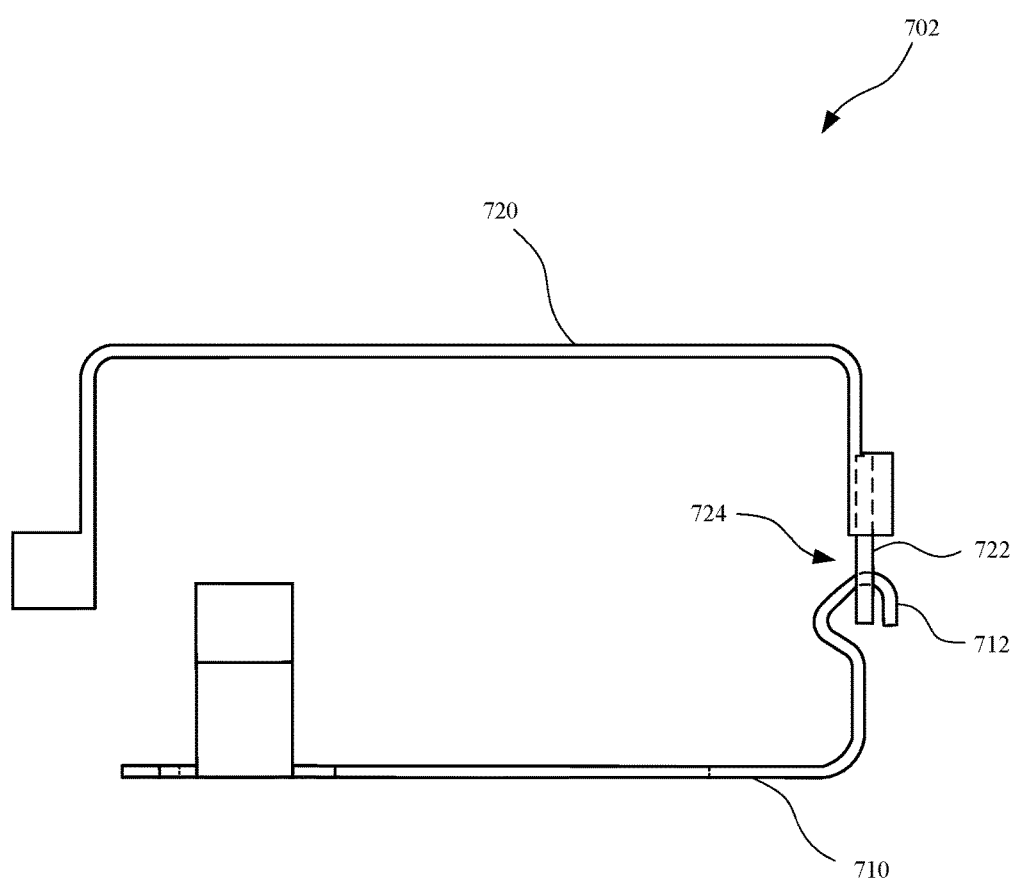
FIG. 10 illustrates a side view of an alternative embodiment of an assembly having a retention member and a hook member insert-molded within the retention member.

An electronic device may include other securing means for securing a camera module during assembly. For example, FIGS. 8-10 illustrate an embodiment of an assembly having a securing member attached to a retention member. FIG. 8 illustrates an isometric view of an embodiment of assembly 502 including securing member 510, retention member 520, and holding member 530, all of which combine to secure a camera module. Retention member 520 may be a flexible strap configured to provide securing means for a camera module in addition to securing means by securing member 510. In some embodiments, retention member 520 is formed from a silicone-based material or materials. Also, in some embodiments, retention member 520 includes a plate 522. Plate 522 may be integrally formed with retention member 520 by an insert-molding process. This may include pouring a silicone-based material into a mold (not shown) that includes plate 522. In this manner, plate 522 may provide additional rigidity to retention member 520. Also, plate 522 may further include first aperture 524 and second aperture 526 configured to receive first spring member 512 and second spring member 514, respectively. In particular, a portion of first spring member 512 and a portion of second spring member 514 may define hook members configured to extend through first aperture 524 and second aperture 526, respectively. Also, assembly 502 may further include holding member 530 configured to seat a camera module. Holding member 530 may act as a cup for the camera module, providing further support during an assembly process. FIG. 9 illustrates an alternative embodiment of assembly 602 having securing member 610 and retention member 620, but without holding member 530 (shown in FIG. 8).

FIG. 10 illustrates a side view of an alternative embodiment of the assembly 702 having retention member 720 and hook member 722 insert-molded within retention member 720. Hook member 722 includes an aperture 724 designed to receive first spring member 712 of securing member 710. In this embodiment, additional structure (e.g., plate 522 in FIG. 8) is not included in an insert-molding process and may reduce materials used as well as the weight of the electronic device.

Most components in successive electronic devices are generally similar. In this regard, components, such as a camera module or a securing member, built within their respective specified tolerances may be installed in any electronic device designed to receive the camera module or the securing member. However, in some cases, several components designed to be assembled together may be at or near the outer ranges of their respective specified tolerances. Moreover, the more components assembled together, the greater the probability for alignment issues due to tolerance issues as additional components lead to additional tolerances. For example, a turret assembly is designed to include parts that have certain characteristics (e.g., concentricity). However, each component of the turret assembly—mask, window, and turret—has its own specified tolerance. In other words, each component is allowed at least some variance. As a result, a turret assembly, when assembled, may include a sum of the variances of its components. In cases where two or more components are at their respective outer ranges of specified tolerances, the turret assembly may be assembled in an undesirable manner. This includes a mask having an aperture that is not concentric with respect to an aperture of a turret. Accordingly, the turret assembly may not be concentric with respect to an aperture of a housing.

Figure 11:
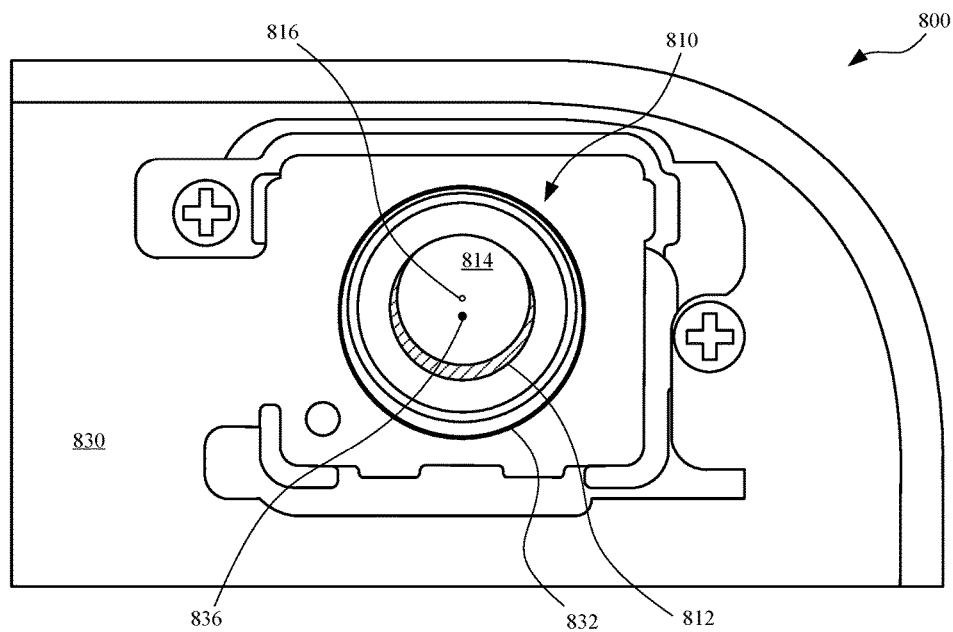
FIGS. 11 and 12 illustrate a process for improving the concentricity of the turret assembly with respect to the housing by rotating the turret assembly.
Figure 12:
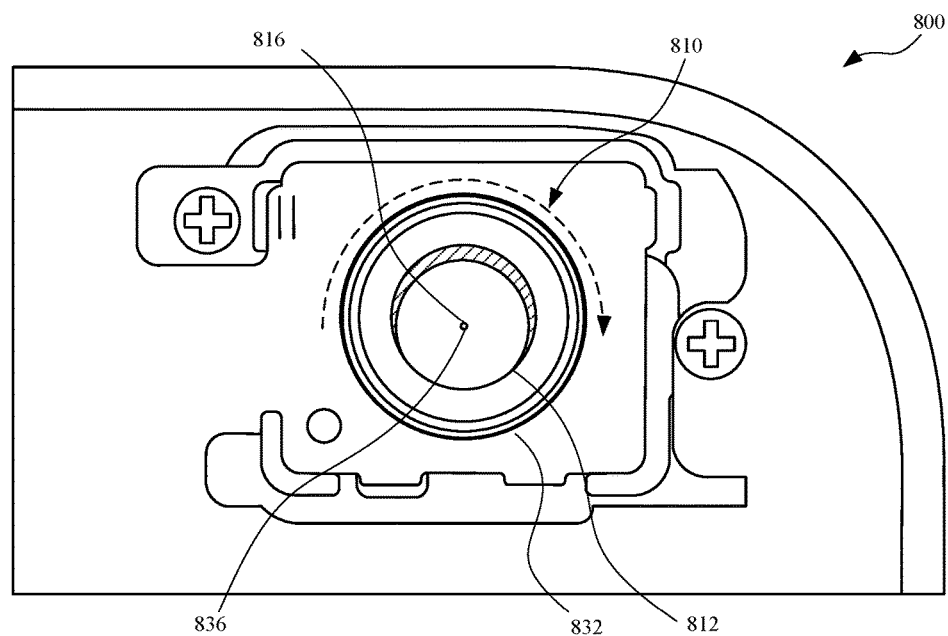

In order to account for these multiple tolerances, several techniques have been developed. For example, FIGS. 11 and 12 illustrate a process for improving the concentricity of an aperture associated within a turret assembly and an aperture associated with a housing of an electronic device. FIG. 11 illustrates an enlarged portion of electronic device 800 including turret assembly 810 having mask 812 (shaded region) and window 814. Also, mask 812 includes center 816 denoted as a point. Housing 830 includes aperture 832 having center 836 denoted as a point. As shown, turret assembly 810 is engaged with housing 830. Ideally, mask 812 is concentric with respect to aperture 832 and center 816 is superimposed on center 836, or vice versa. However, due to specified tolerance issues previously described, mask 812 is not concentric with respect to aperture 832, even though the individual components of turret assembly 810 are within their respective specified tolerances.

FIG. 12 illustrates electronic device 800 in FIG. 11, with turret assembly 810 rotated such that mask 812 is concentric with respect to aperture 832, and center 816 is superimposed on center 836. In this embodiment, the angle of rotation is approximately 180 degrees. In other embodiments, a lesser angle of rotation may be required to create the improved concentricity. This process removes the need for a binning process in which components are pre-selected for each electronic device, which may reduce assembly times. Also, most, if not all, components may be used in any electronic device resulting in improved yields.

Figure 13:
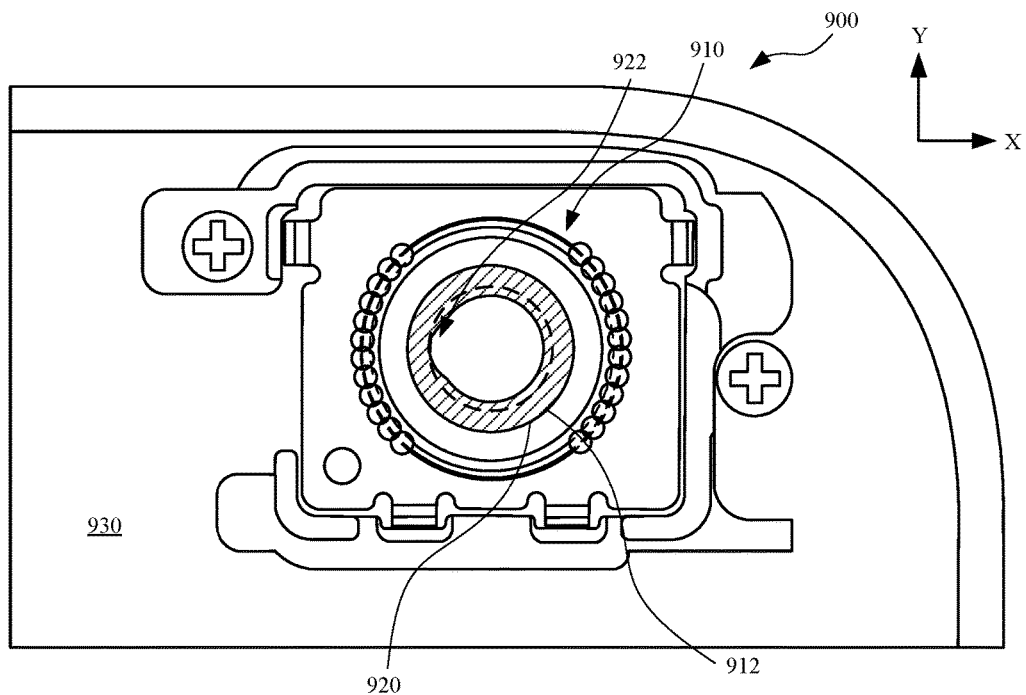
FIG. 13 illustrates an another method for improving the concentricity of the turret assembly with respect to the housing by laser ablating the mask portion of the turret assembly, in accordance with the described embodiments.

Other means for improving the relationship of components may be used. For example, FIG. 13 illustrates an enlarged portion of electronic device 900 having turret assembly 910 including mask 912. As shown, mask 912 is formed with a greater amount of material than desired. In other words, mask 912 includes an aperture intentionally formed to be outside a specified tolerance. However, a laser ablation or laser etching process may be used to remove a portion to place mask 912 within a specified tolerance of mask 912. As shown in FIG. 13, mask 912 includes a laser-ablated portion 922. A laser tool (not shown) may be used to remove additional portions of mask 912 such that mask 912 is within a specified tolerance 920, denoted by dotted lines. In order to determine which locations of mask 912 are to be ablated, housing 930 may be measured in the x- and y-directions. In this manner, mask 912 may be used for any electronic device thereby reducing yield loss.

Figure 14:
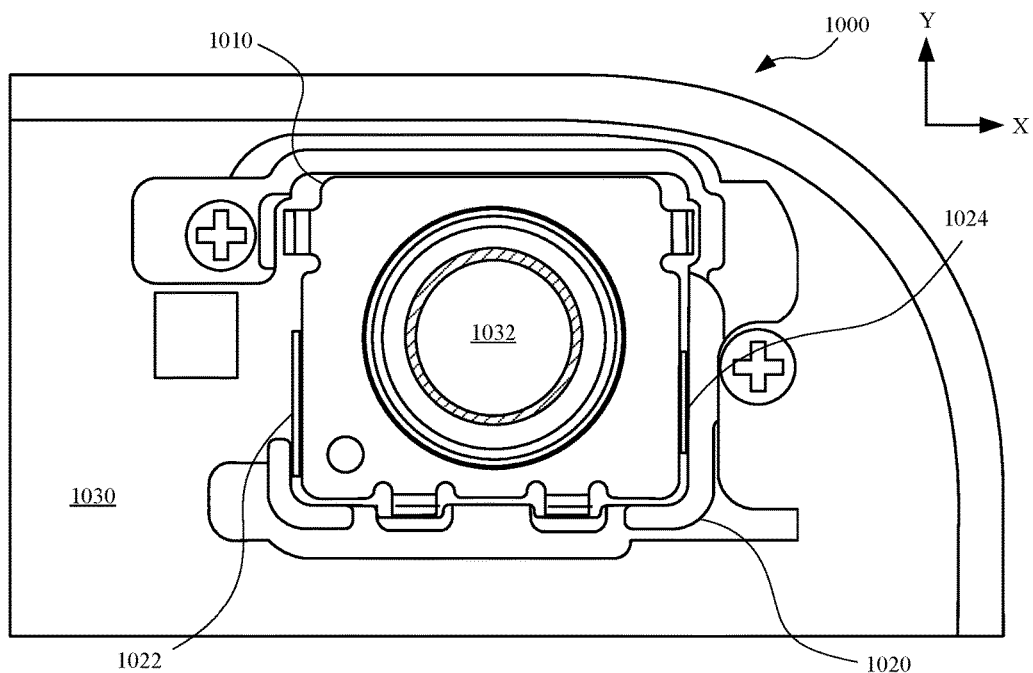
FIG. 14 illustrates a method for improving the concentricity of the camera module with respect to the housing by incorporating alignment members within the housing, in accordance with the described embodiments.

FIG. 14 illustrates an enlarged portion of device 1000 having alignment member 1020 formed with a formed with smaller dimensions than desired. In other words, alignment member 1020 is intentionally formed to be outside a specified tolerance. However, in the embodiment in FIG. 14, first alignment structure 1022 and second alignment structure 1024 are inserted between securing member 1010 and alignment member 1020 in order to align securing member 1010. In some embodiments, first alignment structure 1022 and second alignment structure 1024 are shims having dimensions which, when inserted, allow for securing member 1010 and/or a camera module (not shown) to be installed in a desired manner. This includes, for example, a barrel of the camera module being concentric with respect to aperture 1032 of housing 1030. In some embodiments, only first alignment structure 1022 is required. Also, in some embodiments, first alignment structure 1022 and/or second alignment structure 1024 are positioned in different locations of housing 1030. In order to determine the locations of first alignment structure 1022, and in some cases, second alignment structure 1024, dimensions of the camera module and the dimensions of housing 1030 are measured in the x- and y-directions. In this manner, alignment member 1020 may be used for any electronic device thereby reducing yield loss.

Also, in some embodiments, measurements of a housing may be used for additional purposes. For example, a group consisting of, for example, five to ten camera modules may be measured, and in particular, the enclosures of the camera modules. After measuring the dimensions of the housing, the camera module selected for a particular device is determined by the enclosure that most closely matches corresponding measurements of the housing. In this manner, the selected camera module represents the "best fit" for the housing.

Figure 15:
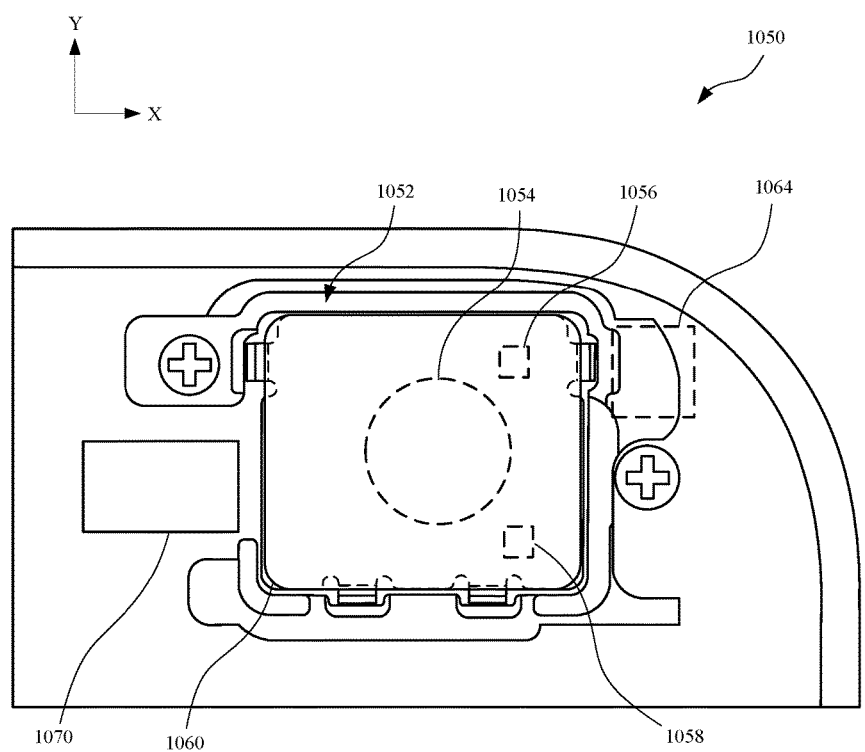
FIG. 15 illustrates an enlarged portion of an electronic device having a camera module positioned within a securing member, further showing a magnetically attractable member configured to provide a magnetic balance within the housing of an electronic device, in accordance with the described embodiments.

In order to focus the camera module, some camera modules include a magnet or magnets positioned within an enclosure of the camera module. For example, FIG. 15 illustrates an enlarged portion of electronic device 1050 having camera module 1052 positioned within securing member 1060. Camera module 1052 may include first magnet 1056 and second magnet 1058, both of which are configured to actuate barrel 1054 to focus camera module 1052. Further, the region 1064 may be a location which receives, for example, a hook member configured to secure a cover glass (not shown). In some cases, the hook member (not shown) is formed from steel or other magnetically attractable materials. As such, first magnet 1056 and second magnet 1058 may be attracted to the hook member, or other magnetically attractable structures proximate to camera module 1052. This may affect the focusing ability of camera module 1052.

In order to offset or discount the effects of magnetically attractable structure or structures, electronic device 1050 may include material 1070 positioned in a location opposite the magnetically attractable structure or structures in region 1064. In some embodiments, material 1070 is a magnet having a polarity opposite first magnet 1056 and/or second magnet 1058. In other embodiments, material 1070 is formed from a ferrous material or materials known to be attracted to a magnet. In this manner, material 1070 provides a "magnetic offset" with respect to a magnetically attractable member in region 1064, and the functionality of first magnet 1056 and second magnet 1058 is not disrupted.

Figure 16:
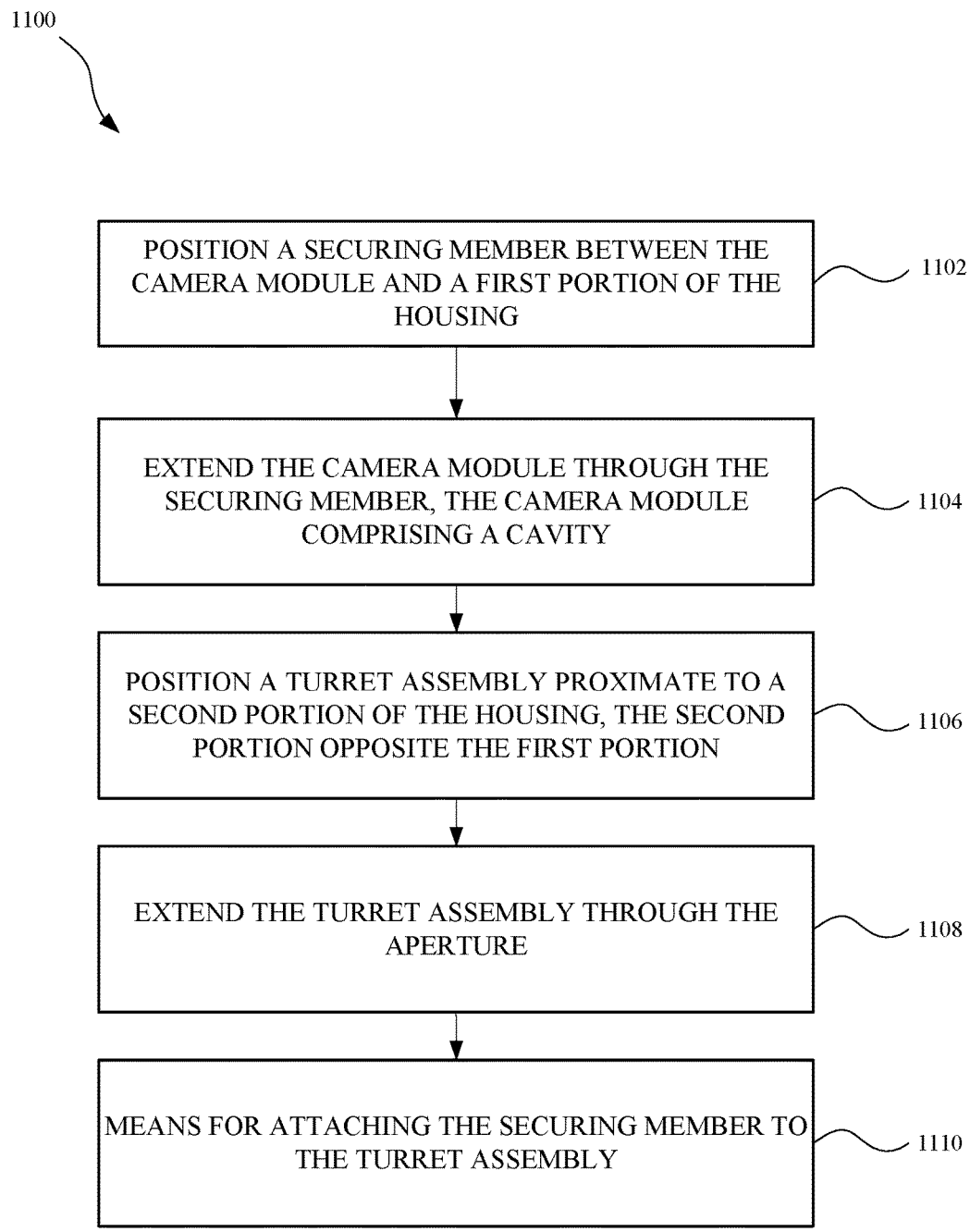
FIG. 16 illustrates a flowchart showing a method for securing a camera module to a housing of an electronic device.

FIG. 16 illustrates a flowchart 1100 showing a method for securing a camera module to housing of an electronic device. In step 1102, a securing member is positioned between the camera module and a first portion of the housing. In some embodiments, the housing includes an aperture extending through the housing. Also, in some embodiments, the securing member and the housing are formed from an electrically conductive material or materials. In step 1104, the camera module is extended through the securing member. In some embodiments, the camera module includes a cavity formed within an enclosure of the camera module. In step 1106, a turret assembly is positioned proximate to a second portion of the housing. The second portion of the housing refers to a location opposite the first portion of the housing. In step 1108, the turret assembly is extended through the aperture. Then in step 1110, the securing member is attached to the turret assembly. For example, the securing member may be welded to the turret assembly. In this manner, the securing member coupled with the housing may form an electrical ground for the camera module when the camera module is secured to the securing member.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    a housing defining an interior region, the housing having a housing through hole;
    a camera module disposed in the interior region, the camera module having a first cavity and a second cavity;
    a single-piece securing module formed form an electrically conductive material and that secures the camera module with the housing, the single-piece securing module comprising:
        a base portion that includes a through hole aligned with the housing through hole,
        a first spring member engaging the first cavity, and
        a second spring member engaging the second cavity; and
    an alignment member disposed in the interior region and comprising a first opening and a second opening, wherein the single-piece securing module is surrounded by the alignment member such that the first spring member is positioned in the first opening and the second spring member is positioned in the second opening.

2. The electronic device of claim 1, wherein:
    the single-piece securing module further comprises a third spring member and a fourth spring member,
    the camera module further comprises a third cavity that receives the third spring member and a fourth cavity that receives the fourth spring member, and
    the first spring member, the second spring member, the third spring member, and the fourth spring member combine to define a retaining force for the camera module.

3. The electronic device of claim 2, wherein the alignment member further comprises:
    a third opening that receives the third spring member; and
    a fourth opening that receives the fourth spring member.

4. The electronic device of claim 1, wherein the first spring member protrudes outward from the base portion, and wherein the second spring member protrudes outward from the base portion.

5. The electronic device of claim 1, wherein the camera module comprises a barrel that extends through the housing through hole.

6. The electronic device of claim 5, wherein the barrel extends at least partially through the housing through hole.

7. The electronic device of claim 1, wherein the single-piece securing module combines with the housing to define an electrical grounding path for the camera module.

8. A securing member for securing a camera module to a housing of an electronic device, the securing member comprising:
    a single piece of electrically conductive metal, comprising:
        a base portion defining a planar surface on which the camera module is seated such that the camera module in contact with the planar surface, the base portion including a through hole to receive that receives a barrel of the camera module allowing the barrel to extend through the base portion via the through hole; and
        multiple spring members integrally and continuously formed with and bent away from the base portion at the planar surface to surround the camera module and secure the camera module to the base portion, wherein when the multiple spring members secure the camera module, both the planar surface of the base portion and the multiple spring members define an electrical grounding path for the camera module.

9. The securing member of claim 8, wherein the multiple spring members comprises a first spring member and a second spring member, the first spring member and the second spring member extending from a first side of the base portion.

10. The securing member of claim 9, wherein the multiple spring members further comprises a third spring member and fourth spring member, the third spring member extending from a second side of the base portion different from the first side, the fourth spring member extending from a side selected from the second side or a third side of the base portion different from the first side and the second side.

11. The securing member of claim 10, wherein:
the first spring member is adapted to engage a first cavity of the camera module,
the second spring member is adapted to engage a second cavity of the camera module,
the third spring member is adapted to engage a second cavity of the camera module, and
the fourth spring member is adapted to engage a second cavity of the camera module.

12. The securing member of claim 9, further comprising a third spring member and a fourth spring member, wherein:
the base portion includes a second side opposite the first side,
the first spring member and the second spring member extend from the first side, and
the third spring member and the fourth spring member extend from the second side.

13. The securing member of claim 8, wherein both the base portion and the multiple spring members are formed only from the single piece of electrically conductive material.

14. The securing member of claim 13, wherein the single piece of electrically conductive material includes a metallic material that includes at least one of gold, aluminum, stainless steel, and titanium copper.

15. A method for assembling an electronic device having a housing that defines an interior region, the housing having a housing through hole, the method comprising:
securing a camera module with a single-piece securing module in the interior region, the camera module having a first cavity and a second cavity, the single-piece securing module comprising:
a base portion including a through hole aligned with the housing through hole,
a first spring member engaging the first cavity, and
a second spring member engaging the second cavity; and
surrounding the single-piece securing module with an alignment member, the alignment member comprising a first opening and a second opening, wherein the first spring member is positioned in the first opening and the second spring member is positioned in the second opening.

16. The method of claim 15, further comprising securing the single-piece securing module to a turret assembly comprises by welding the single-piece securing module to the turret assembly.

17. The method of claim 16, further comprising aligning an aperture of the turret assembly such that the aperture of the turret assembly is concentric with respect to the aperture of the single-piece securing module.

18. The method of claim 15, wherein securing the camera module to the single-piece securing module comprises engaging the camera module with the first spring member and the second spring member.

19. The method of claim 18, wherein engaging the securing with the first spring member and the second spring member comprises securing the camera module with the housing.

20. The method of claim 15, further comprising aligning the single-piece securing module with the housing through hole such that the through hole of the single-piece securing module is concentric with respect to the housing through hole.

* * * * *